(12) United States Patent
Godefroid

(10) Patent No.: US 7,004,216 B2
(45) Date of Patent: Feb. 28, 2006

(54) TIRE TREAD INCLUDING SPACED PROJECTIONS IN BASE OF GROOVE

(75) Inventor: Alain Josée Joseph Godefroid, Meix-le-Tige (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 32 days.

(21) Appl. No.: 10/733,138

(22) Filed: Dec. 11, 2003

(65) Prior Publication Data

US 2005/0126670 A1   Jun. 16, 2005

(51) Int. Cl.
*B60C 11/13*   (2006.01)

(52) U.S. Cl. .............................. 152/209.18; 152/209.22
(58) Field of Classification Search ........... 152/209.18, 152/209.19, 209.21, 209.22
See application file for complete search history.

(56) References Cited

U.S. PATENT DOCUMENTS

| | | | | | |
|---|---|---|---|---|---|
| 2,268,344 | A | * | 12/1941 | Shesterkin | 152/209.22 |
| 3,727,661 | A | * | 4/1973 | Hoke | 152/209.22 |
| 3,938,572 | A | | 2/1976 | Nishi et al. | 152/209 R |
| 4,031,938 | A | | 6/1977 | Verdier | 152/209 R |
| 6,003,575 | A | | 12/1999 | Koyama et al. | 152/209.18 |
| 6,050,313 | A | | 4/2000 | Tsuda | 152/209.18 |
| 6,415,835 | B1 | * | 7/2002 | Heinen | 152/209.22 |
| 6,505,661 | B1 | * | 1/2003 | Nakagawa et al. | 152/209.22 |
| 2002/0112801 | A1 | * | 8/2002 | Matsumoto | 152/209.18 |

FOREIGN PATENT DOCUMENTS

| | | | |
|---|---|---|---|
| WO | WO 95/18022 | * | 7/1995 |
| WO | WO 98/03357 | * | 1/1998 |

* cited by examiner

*Primary Examiner*—Steven D. Maki
(74) *Attorney, Agent, or Firm*—Nancy T. Krawczyk

(57) ABSTRACT

Disclosed is a tread for a pneumatic tire. The tread has a plurality of grooves. The grooves have a base defining the depth of the groove relative to the tread surface, opposing groove walls, and a centerline equidistance from the opposing groove walls. The groove may extend in either a circumferential or a lateral direction of the tread when the tread is applied to a pneumatic tire. At least one of the grooves has a plurality of spaced projections in the base of the groove. The projections extend from one groove wall to the opposing groove wall and are inclined relative to the groove centerline at an angle of 10° to 50°. The projections have a pitch length measured at the groove centerline of 0.75–1.25 the projection length as measured along the groove centerline. The pitch length is the length as measured from one point of the projection along the centerline to the same point in the adjacent projection.

9 Claims, 4 Drawing Sheets

TIRE TREAD INCLUDING SPACED PROJECTIONS IN BASE OF GROOVE

FIELD OF THE INVENTION

The present invention is directed to a tire. More specifically, the present invention is directed to a tread for a pneumatic tire wherein the tread has improved water flow characteristics.

BACKGROUND OF THE INVENTION

Improved wet performance characteristic is a known goal for tire designers. This can be achieved by selective tread compounding, tire engineering, or tread designing. When the tread design is modified to improve the wet performance of the tire, the goal is to quickly move the water out of the contact patch formed between the tire and the pavement. Water is typically evacuated from the contact patch through the tread grooves.

Grooves modified to improve water flow performance have focused on widening the grooves, sloping the sides of the grooves, inclining the grooves relative to the equatorial plane of the tire. All of these variations have helped to move the water.

SUMMARY OF THE INVENTION

The present invention is directed to modifying a tire groove wherein the flow of the water though the groove is modified, thereby increasing the flow of the water through the groove.

The present invention is directed to creating a helical flow of water through a tread groove, to assist in evacuating the water from the tread.

Disclosed is a tread for a pneumatic tire. The tread has a plurality of grooves. The grooves have a base defining the depth of the groove relative to the tread surface, opposing groove walls, and a centerline equidistance from the opposing groove walls. The groove may extend in either a circumferential or a lateral direction of the tread when the tread is applied to a pneumatic tire. At least one of the grooves has a plurality of spaced projections in the base of the groove. The projections extend from one groove wall to the opposing groove wall and are inclined relative to the groove centerline at an angle of 10° to 50°. The projections have a pitch length measured at the groove centerline of 0.75–1.25 the projection length as measured along the groove centerline. The pitch length is the length as measured from one point of the projection along the centerline to the same point in the adjacent projection. The spacing between the projections is greater than the width of the projections.

In one aspect of the invention, at the groove centerline, the projections in the groove have a maximum radial height of 35% of the groove depth. At the groove sidewall, the ends of the projection may terminate at a height of 40–60% of the groove depth, as measured a base of the groove.

In another aspect of the invention, the radially outermost surface of the projection, along the length of the projection, is flat. The radially outermost surface may, alternatively, by curved radially inwardly or pointed in either direction.

In another aspect, the cross-sectional configuration of the projection, parallel to the width of the projection, is selected from the group consisting of square, rectangular, triangular, raised triangular, or rounded.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

Figure 1:
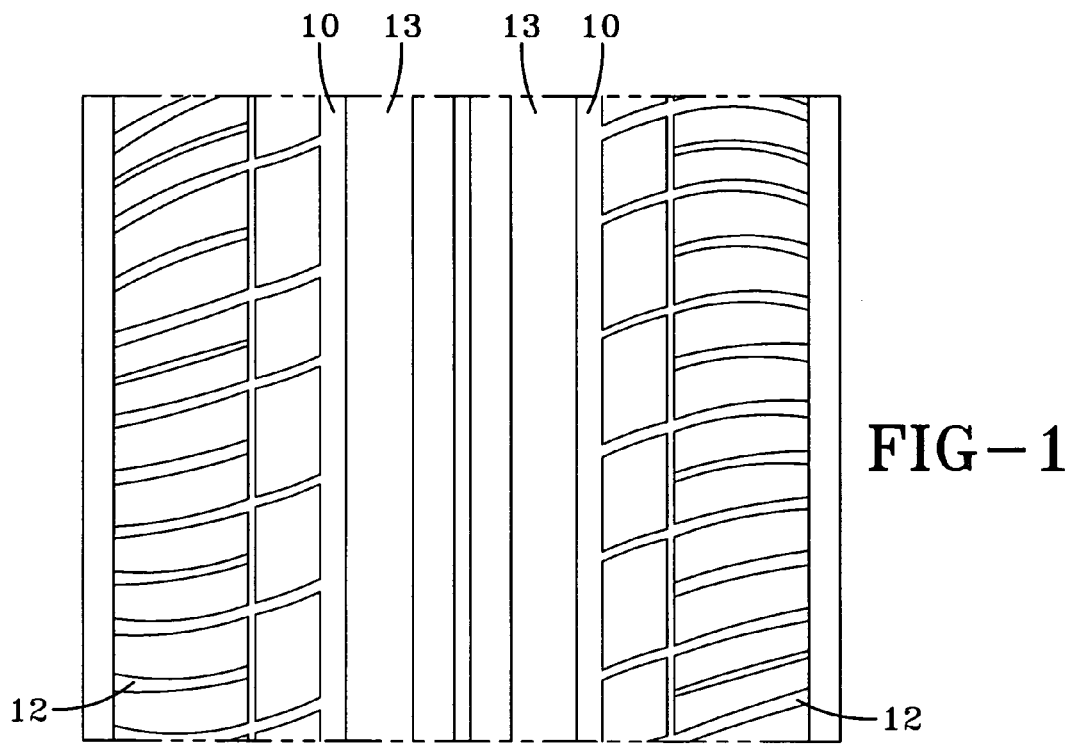
FIG. 1 is a portion of a tread most suitable for a passenger vehicle.

A portion of a tread suitable for a passenger vehicle tire is illustrated in FIG. 1. The tread is defined by a plurality of circumferential grooves 10 and lateral grooves 12. In the particular tread illustrated, the circumferential grooves 10 form a pair of continuous ribs 13, one on each side of the tire centerplane. The lateral grooves 12 are located in the axially outer regions of the tread, and extend into the shoulder regions of a tire. Those skilled in the art will appreciate that the tread of FIG. 1 is exemplary of a single tread, and the present invention is not limited to this tread configuration. It is within the scope of the present invention for the circumferential and lateral grooves 10, 12 to form any desired tread configuration.

Figure 2:
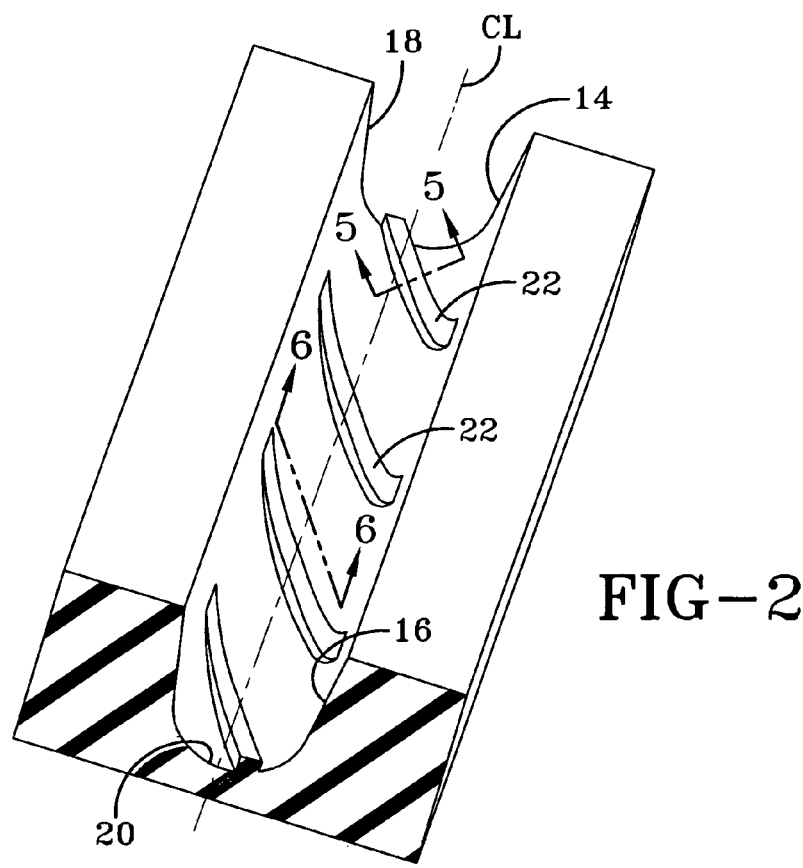
FIG. 2 is a portion of a tread groove.

A portion of a tread groove 14 is seen in FIG. 2. The portion of the groove 14 may be from either the circumferential or lateral groove 10, 12. The groove 14 has a pair of opposing sidewalls 16, 18. The sidewalls 16, 18 are inclined relative to a vertical plane of the tread. Equidistant from each groove sidewall 16, 18, and following the configuration of the groove, is a groove centerline CL. The base 20 of the groove 14 smoothly connects the opposing sidewalls 16, 18. The groove base 20 also defines the depth d of the groove 14, relative to the tread surface. Preferably, the maximum depth d of the groove 14 is at the centerline CL.

Figure 3:
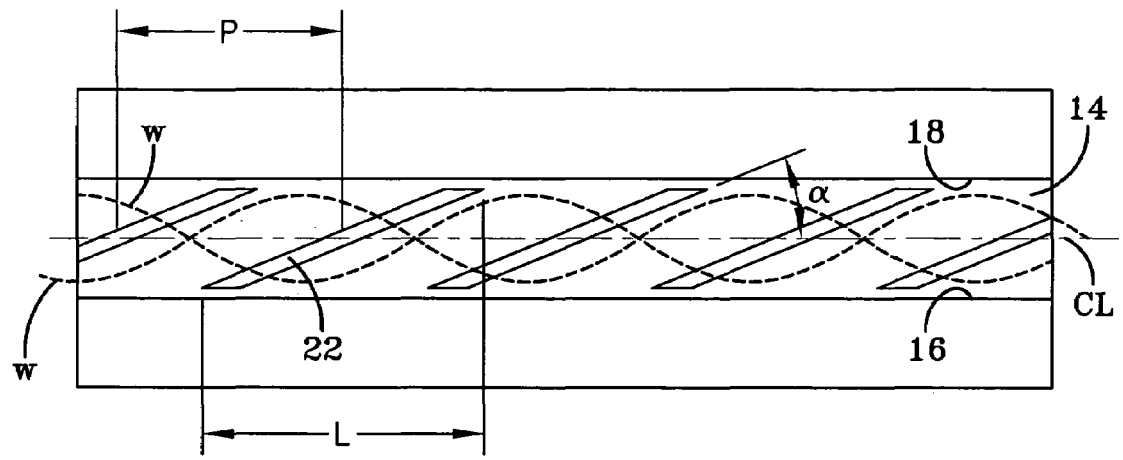
FIG. 3 is a top view of a groove, showing the desired water flow pattern through the groove.
Figure 4:
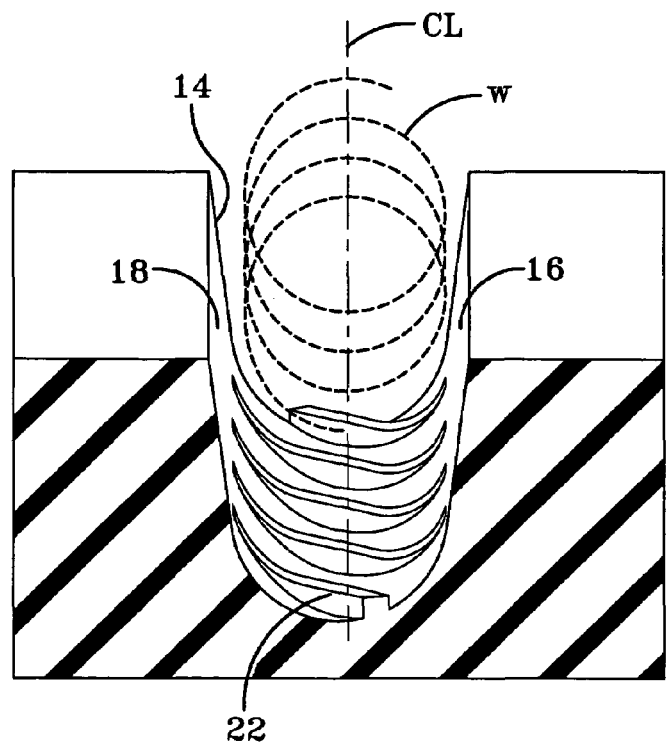
FIG. 4 is a perspective view of a groove, showing the desired water flow pattern.
Figure 5A:
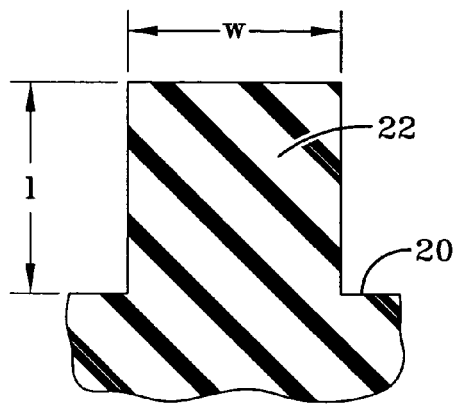
FIGS. 5A–5D are cross-sectional views of the projections in a tread grooves.
Figure 5B:
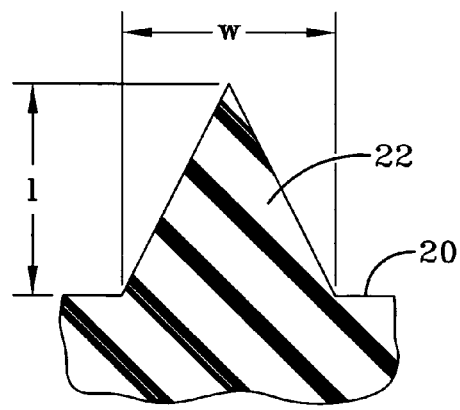
Figure 5C:
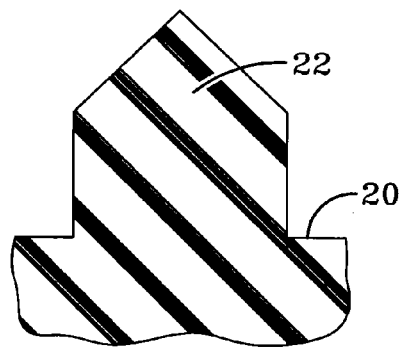
Figure 5D:
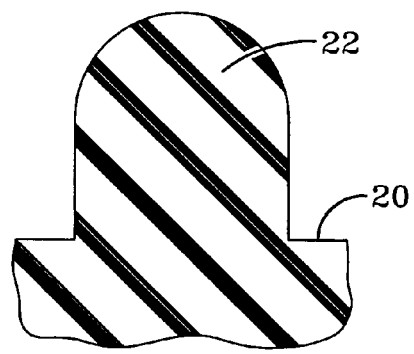

Located in the base 20 of the groove 14 is a plurality of spaced flow projections 22. The ideal goal of the projections 22 in the groove base 20 is to create helical rotation of any water flowing through the groove 14, seen as lines W in FIGS. 3 and 4, thereby accelerating the evacuation of the water from the groove 14. By properly selecting the projection shape, spacing, and inclination, this goal can be achieved.

The flow projections 22 are small rib-like elements that extend from one grove wall 16 to the opposing groove wall 18. The projections 22 are inclined at angles α of 10° to 50° relative to the groove centerline, see FIG. 3. The projections 22 have both a length L and a pitch length P. The length L of the projections 22, as measured along the groove centerline CL, is the length from one end of the projection 22 to the opposing end of the projection 22. The pitch length P is the distance of one projection 22 to the next adjacent projection, as measured along the groove centerline CL. The pitch length P of the projections is 0.75 to 1.25 times the projection length L.

The cross-sectional configuration of the projection 22, as seen parallel to the width of the projection along line 5—5 of FIG. 1 can vary, see FIGS. 5A–5D. The projection 22 may have a square or rectangular cross section, FIG. 5A, a triangular configuration, FIG. 5B, a raised triangular configuration, FIG. 5C, or a rounded configuration, FIG. 5D. Other polygon configurations are also possible.

The height h and width w of the projection 22 are relative to each other, with a ratio of 2:1 to 0.75:1 of height versus width. Preferably, the projection height h is 1.5 times the projection width w. The height h of the projection 22 relative to the groove depth d is also determinative of the flow properties of water through the groove. At the groove centerline CL, the projection 22 has a height h of 10–35% of the groove depth d. If the projection 22 is too short, than the flow of the water is not affected by the projection 22; if the projection 22 is too tall, the water flow is not transformed into the desired vortex.

Figure 6A:
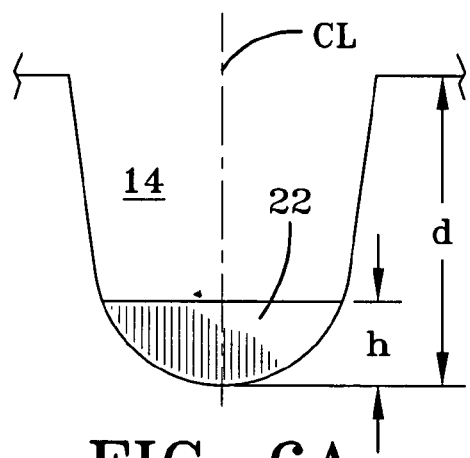
FIGS. 6A–6C are side views of the projections.
Figure 6B:
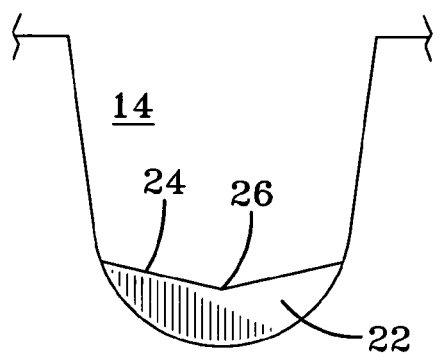
Figure 6C:
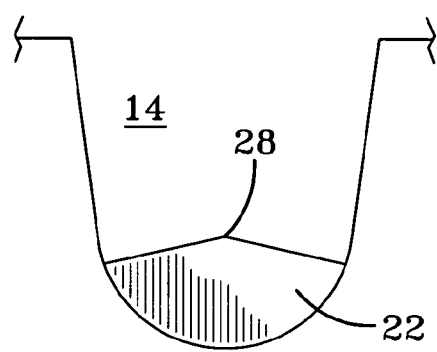

To affect the water flow characteristics through the groove 14, the radially outer surface 24 of the projection 22 along the length of the projection 22, viewed from a plane parallel to the length L of the projection 22 and as viewed from line 6—6 in FIG. 2, may also be varied as seen in FIGS. 6A–6D. The radially outer surface 24 of the projection 22 of FIG. 6A is parallel to the horizontal plane or tread surface of the tire. For the projection 22 of FIG. 6B, the radially outer surface 24 of the projection is V-shaped. The point 26 of the V is shown as being at the mid-point of the projection's length, however, the point 26 of the V may be located at any position along the projection's length to optimize the water flow pattern through the groove 14. The projection 22 of FIG. 6C is opposite in configuration to that of FIG. 6B. Again, the point 28 of the V may be at any position along the length of the projection.

Figure 7A:
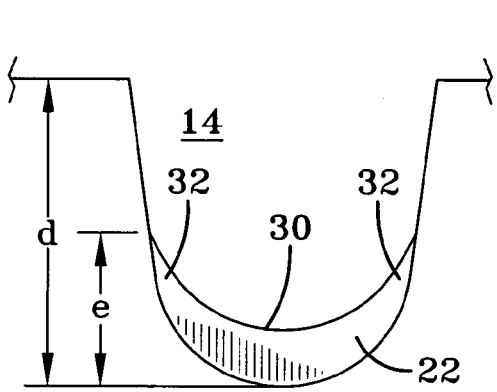
FIG. 7A is a side view of another embodiment of the projections.

The projection 22 of FIG. 7A is also a view from a plane parallel to the length L of the projection 22. The projection 22 has a radially outer surface 24 that is curved inward. The innermost point 30 of the outer surface 24 may be located at any point along the length of the projection 22. The ends 32 of the projection 22 terminate along the groove sidewalls 16, 18 at a height e approximately 50% of the groove depth d. When the ends 32 of the projection extend up the sidewall, the projections terminate at a height of 40–60% of the groove depth d.

Figure 7B:
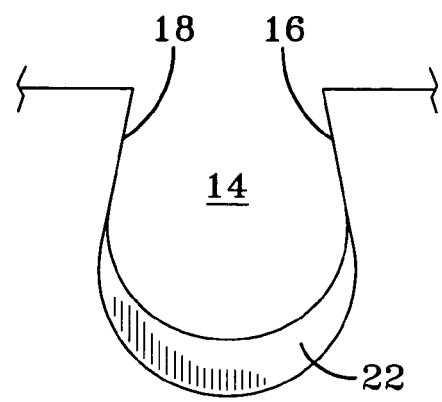
FIG. 7B is a side view of the groove and projection of FIG. 7A under compression.

When the groove 14 of FIG. 7A is under compression, as seen in FIG. 7B, the groove sidewalls 16, 18 are pushed towards one another and the compression changes the outer profile of the projection 22. The overall opening then becomes a closer approximation of a circular shape, and with the inclined projections along the groove base 20, works to create the desired helical water flow pattern through the groove. The flexing of the groove sidewalls as it travels in and out of compression also acts to pump the water though the grooves and over the projections 22.

The goal of the invention is to create a helical flow of the water through the grooves of a tire tread. The disclosed projections 22 may be located in any groove of a tire tread. If the tread is designed for an off the road vehicle or a large truck tire, having a smaller net-to-gross ratio, the projections 22 may also be used to help evacuate the grooves.

What is claimed is:

1. A tread for a pneumatic tire, the tread comprising a tread surface having a plurality of grooves therein, the grooves having a base defining the depth of the groove relative to the tread surface, and opposing groove walls, a centerline equidistance from the opposing groove walls, the grooves extending in either a circumferential or a lateral direction of the tread, wherein at least one of the grooves has a plurality of spaced projections in the base of the groove, the projections extending from one groove wall to the opposing groove wall and inclined relative to the groove centerline at an angle of 10° to 50°, the projections having a pitch length measured at the groove centerline of 0.75–1.25 the projection length as measured along the groove centerline wherein the spacing between the projections is greater than the width of the projections.

2. The tread of claim 1 wherein, at the groove centerline, the projections have a maximum radial height of 35% of the groove depth.

3. The tread of claim 1 wherein, at the sidewalls, the projections terminate at a height of 40–60% of the groove depth, as measured a base of the groove.

4. The tread of claim 1 wherein the at least one of the grooves extends in the circumferential direction of the tread.

5. The tread of claim 1 wherein the at least one of the grooves extends in a lateral direction of the tread.

6. The tread of claim 1 wherein the radially outermost surface of the projection, along the length of the projection, is flat.

7. The tread of claim 1 wherein the radially outermost surface of the projection, along the length of the projection, is peaked.

8. The tread of claim 1 wherein the radially outermost surface of the projection, along the length of the projection, is curved radially inwardly.

9. The tread of claim 1 wherein the cross-sectional configuration of the projection, parallel to the width of the projection, is selected from the group consisting of square, rectangular, triangular, raised triangular, or rounded.

* * * * *